United States Patent
Schneidewend et al.

(10) Patent No.: US 6,182,287 B1
(45) Date of Patent: Jan. 30, 2001

(54) PREFERRED SERVICE MANAGEMENT SYSTEM FOR A MULTIMEDIA VIDEO DECODER

(75) Inventors: Daniel Richard Schneidewend; Aaron Hal Dinwiddie, both of Fishers; Steven Charles Rhoads, Carmel, all of IN (US)

(73) Assignee: Thomson Licensing S.A., Boulogne, Cedex (FR)

(*) Notice: Under 35 U.S.C. 154(b), the term of this patent shall be extended for 0 days.

(21) Appl. No.: 09/244,218

(22) Filed: Feb. 4, 1999

(51) Int. Cl.[7] ............................. H04N 5/445; G06F 3/00; G06F 13/00

(52) U.S. Cl. ........................... 725/48; 725/39; 725/46; 725/47; 345/327

(58) Field of Search .................. 348/7, 13, 906, 348/564, 10, 6; 345/327, 353; H04N 7/00, 7/11

(56) References Cited

U.S. PATENT DOCUMENTS

| | | | |
|---|---|---|---|
| 4,425,579 | 1/1984 | Merrell | 358/86 |
| 5,187,470 | 2/1993 | King et al. | 340/825 |
| 5,317,403 | 5/1994 | Keenan | 348/731 |
| 5,323,240 | 6/1994 | Amano et al. | 348/731 |
| 5,414,426 | 5/1995 | O'Donnell et al. | 341/176 |
| 5,477,262 | 12/1995 | Banker et al. | 348/7 |
| 5,550,576 | * 8/1996 | Klosterman | 348/6 |
| 5,596,373 | 1/1997 | White et al. | 348/569 |
| 5,635,989 | 6/1997 | Rothmuller . | |
| 5,761,604 | 6/1998 | Stough | 455/3.2 |
| 5,809,204 | 9/1998 | Young et al. | 386/83 |
| 5,940,073 | * 8/1999 | Klosterman et al. | 345/327 |
| 6,005,565 | * 12/1999 | Legall et al. | 345/327 |
| 6,014,184 | * 1/2000 | Knee et al. | 348/731 |

FOREIGN PATENT DOCUMENTS

| | | | |
|---|---|---|---|
| 0822713A1 | 2/1998 | (EP) | H04N/5/445 |
| 0849954A2 | 6/1998 | (EP) | H04N/7/58 |
| WO97/32434 | 9/1997 | (WO) | H04N/5/44 |
| WO97/48230 | 12/1997 | (WO) | H04N/7/00 |

* cited by examiner

*Primary Examiner*—Nathan Flynn
*Assistant Examiner*—Vivek Srivastava
(74) *Attorney, Agent, or Firm*—Joseph S. Tripoli; Ronald H. Kurdyla; Alexander J. Burke

(57) ABSTRACT

A video decoder provides an interface enabling a User to create, manage and maintain favorite service lists for facilitating User navigation through a complex array of multimedia services. The on-screen display interface system generates an abbreviated menu list of favorite multimedia services available from both local and remote sources to enable navigation through user selected favorite services. A database associates individual services and corresponding menu items in the favorite services menu with their respective sources and supports service selection, tuning and acquisition. Additional abbreviated lists of favorite multimedia services, comprising sub-sets of parent service lists, are also hierarchically displayed in response to User command in order to facilitate and focus a search for a desired service.

23 Claims, 8 Drawing Sheets

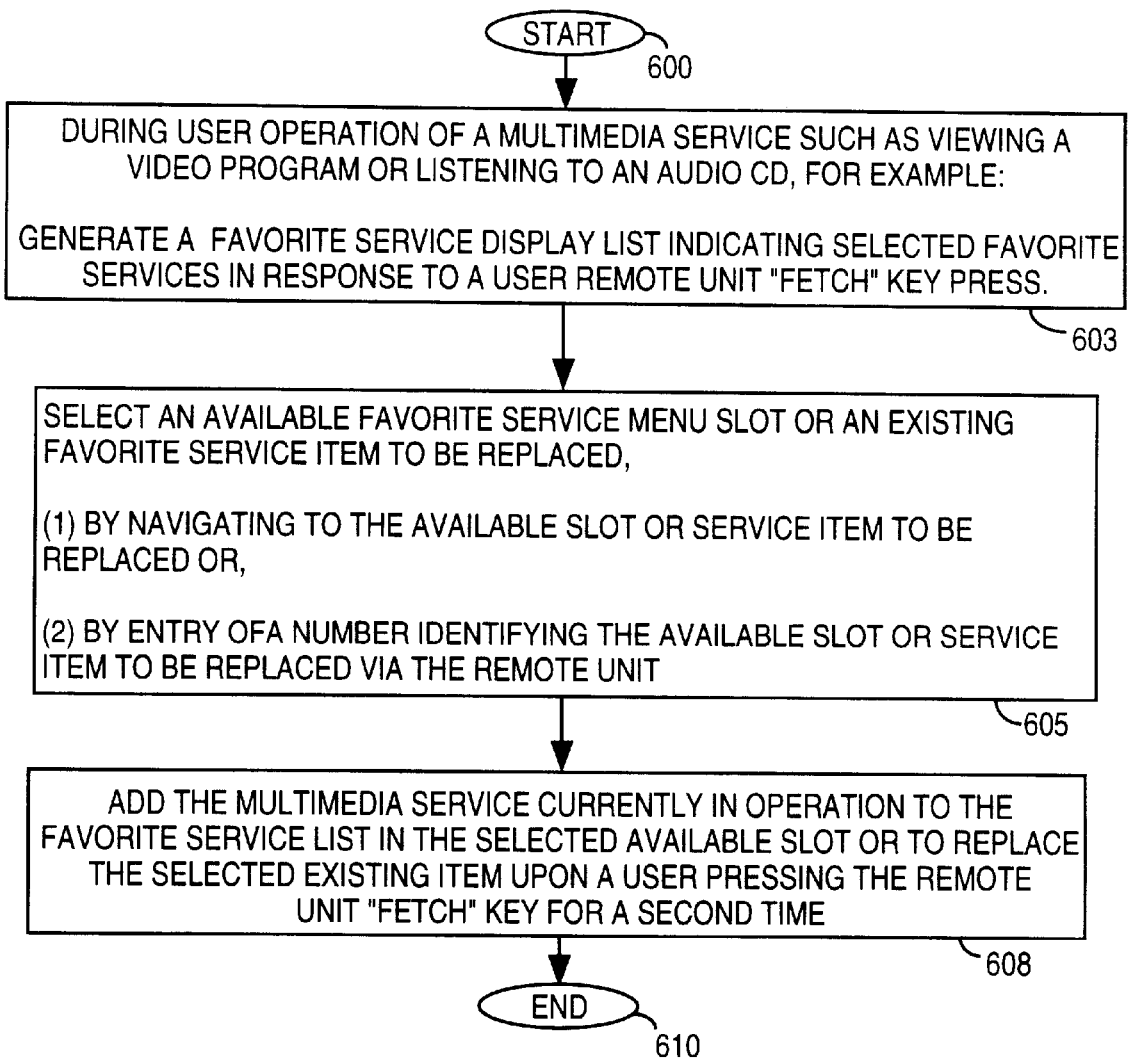

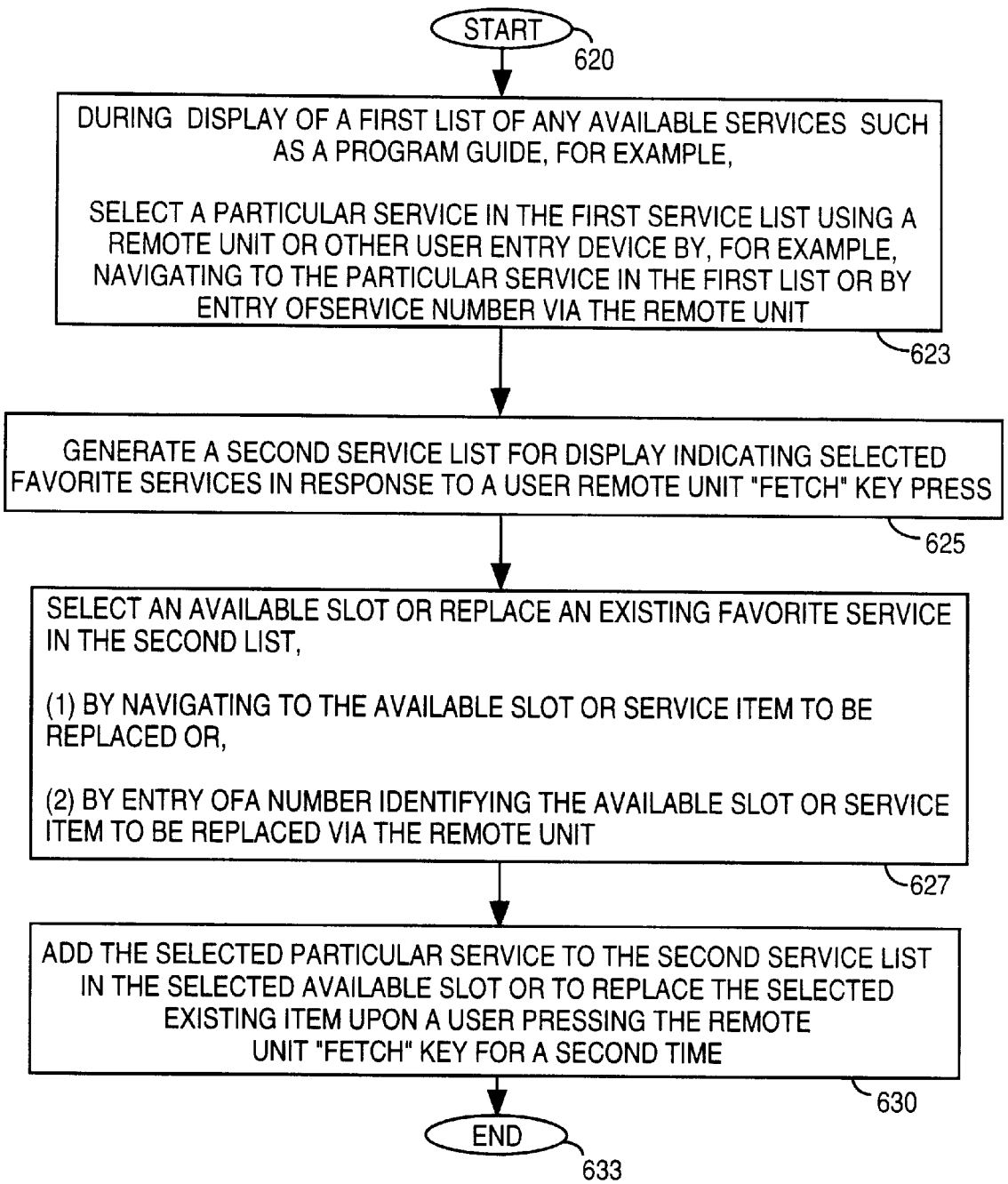

US 6,182,287 B1

PREFERRED SERVICE MANAGEMENT SYSTEM FOR A MULTIMEDIA VIDEO DECODER

FIELD OF THE INVENTION

This invention is related to the creation, management and navigation of favorite service lists, e.g. favorite video channel lists, in a multimedia video decoder.

BACKGROUND OF THE INVENTION

Home entertainment systems which combine Personal Computer and television functions (PC/TV systems), are increasingly becoming, generic, User interactive, multiple source and multiple destination communication devices. Such systems are required to communicate in different data formats between multiple locations for a variety of applications in response to User requests. For example, a PC/TV system may receive data from satellite or terrestrial sources comprising High Definition Television (HDTV) broadcasts, Multi-point Microwave Distribution System (MMDS) broadcasts and Digital Video Broadcasts (DVB). A PC/TV system may also receive and transmit data via telephone (e.g. the Internet) and coaxial lines (e.g. cable TV) and from both remote and local sources such as Digital Video Disk (DVD), CDROM, VHS and Digital VHS (DVHS™) type players, PCs, and many other types of sources.

A number of problems arise in devising a User interface for a PC/TV system that supports complex User interactive tasks whilst providing a simple command interface suitable for the general public. Specifically, problems arise in providing an interface enabling a User to create, manage and maintain favorite service lists across a spectrum of multimedia services. It is desirable that such lists should facilitate User navigation through the complex array of multimedia services provided in a multimedia decoder. These problems and derivative problems are addressed by a system according to the present invention.

SUMMARY OF THE INVENTION

A video decoder on-screen display interface system generates an abbreviated menu list of favorite multimedia services available from both local and remote sources to enable navigation through user selected favorite services. A database associates individual services and corresponding menu items in the favorite services menu with their respective sources and supports service selection, tuning and acquisition. Additional abbreviated lists of favorite multimedia services, comprising sub-sets of parent service lists, are also hierarchically displayed in response to User command in order to facilitate and refine a search for a desired service.

BRIEF DESCRIPTION OF THE DRAWINGS

In the drawing:

FIG. 7 shows a flowchart for facilitating the addition of a favorite multimedia service to a favorite service list during operation of the multimedia service, according to the invention.

FIG. 8 shows a flowchart for facilitating the addition of a favorite multimedia service selected from a first list of services to a second favorite service list, according to the invention.

DETAILED DESCRIPTION OF THE DRAWINGS

Figure 1:
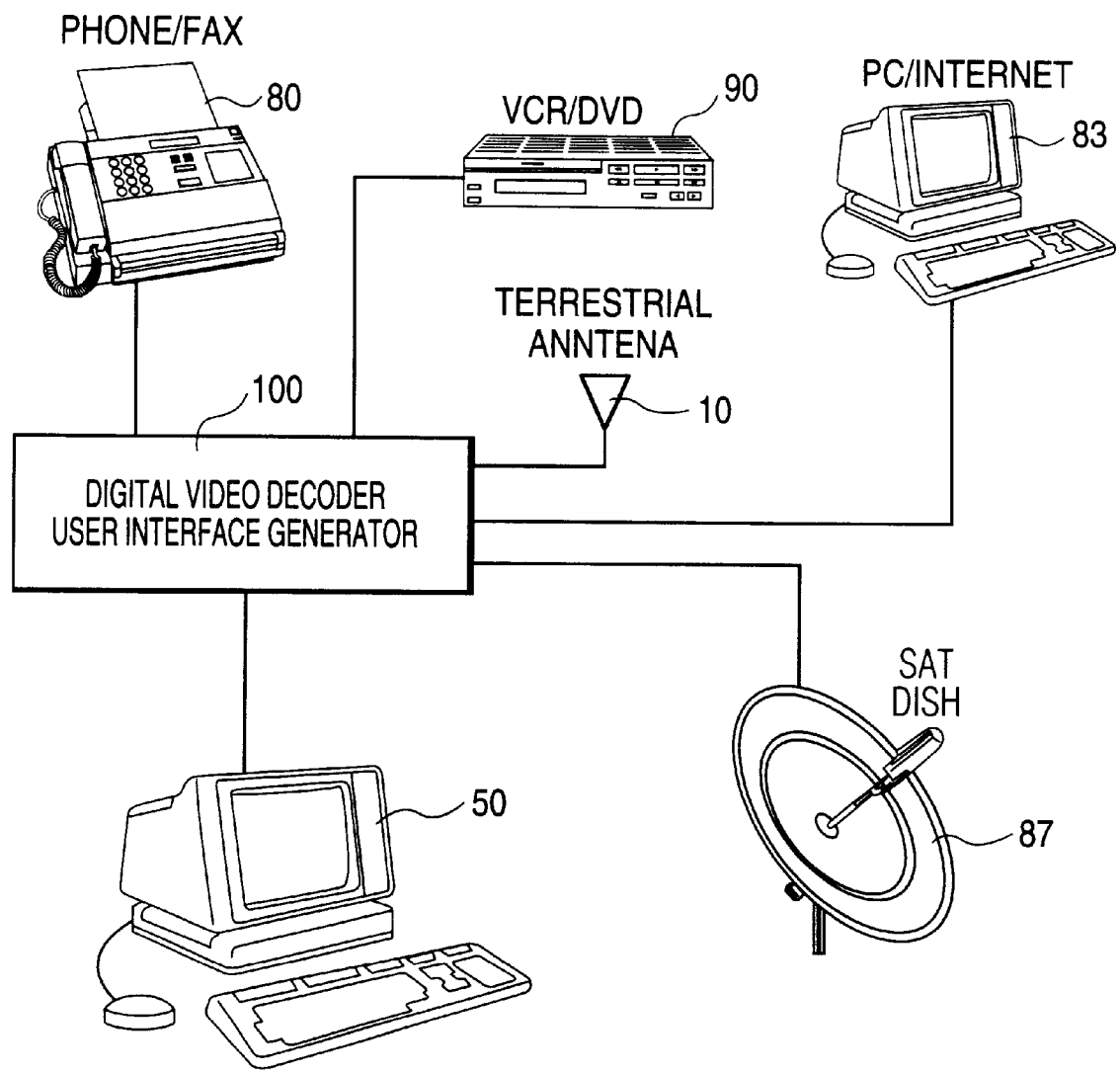
FIG. 1 is a block diagram of a multimedia system showing communication interfaces to both local and remote devices.

FIG. 1 is a block diagram of an exemplary multimedia system showing communication interfaces to both local and remote devices. Decoder 100 processes video program and other data from a plurality of different sources including terrestrial antenna 10, satellite dish 87, PC/Internet source 83, VCR/DVD unit 90 and phone/fax system 80. Decoder 100 may also process data for output to an EEE 1394 compatible device, an HDTV decoder, an ethernet linked device, a DVHS system and may provide a picture-in-picture output directly to another reproduction device. Decoder 100 provides an interface enabling a User to create, manage and maintain favorite service lists for facilitating User navigation through a complex array of multimedia services. Specifically, the decoder 100 interface system provides an abbreviated list of favorite multimedia services available from both local and remote sources to enable a User to rapidly change decoder 100 function and acquire a new service. Additional abbreviated lists of favorite multimedia services comprising sub-sets of parent service lists are also hierarchically displayed in response to User command. A database associates individual services and corresponding menu items in the favorite services menu with their respective sources and supports service selection, tuning and acquisition.

Figure 2:
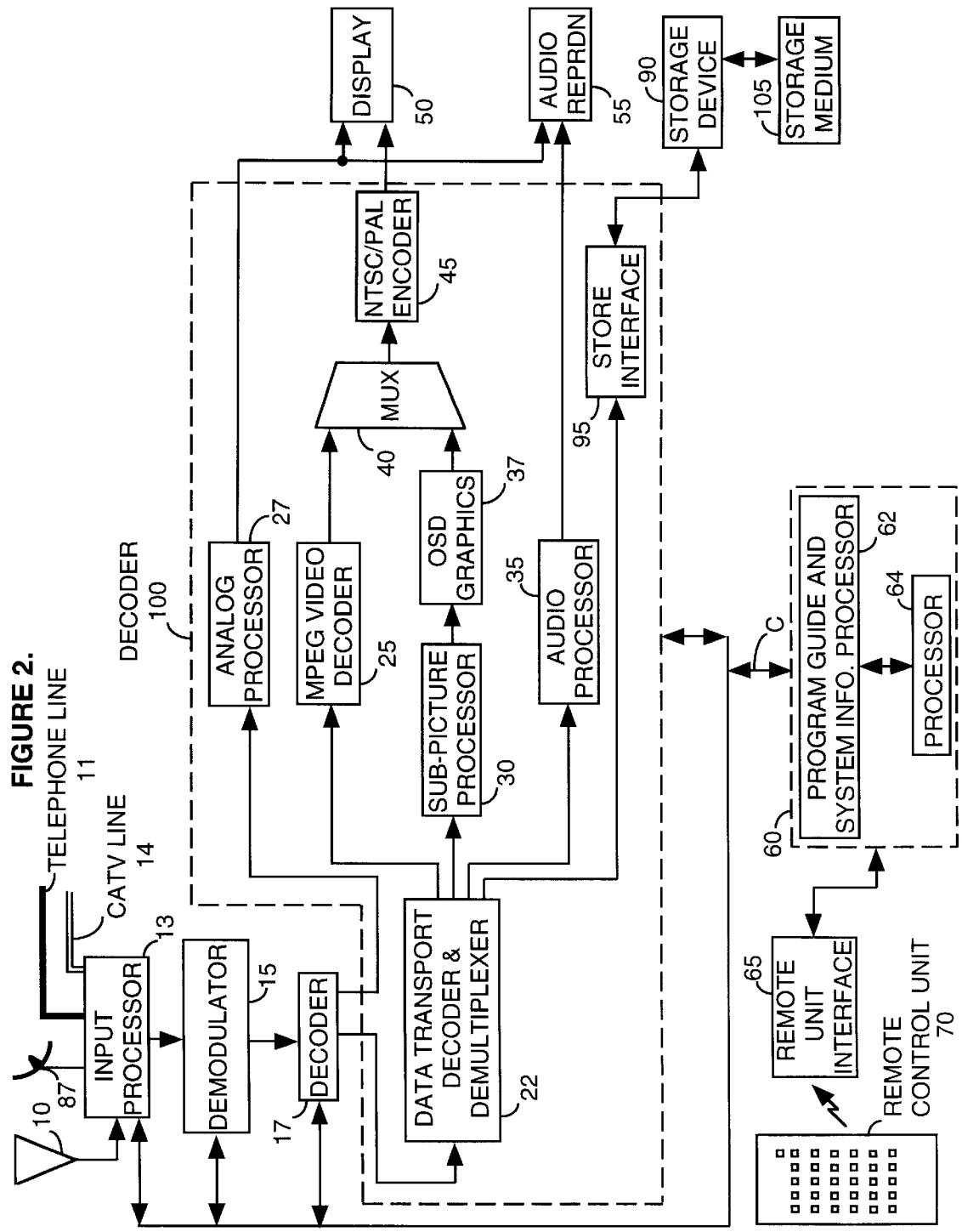
FIG. 2 is a block diagram of a digital video processing system employing a User interface including favorite service menus, according to the principles of the invention.

FIG. 2 is a block diagram of a digital video processing system employing a User interface including favorite service menus, according to the principles of the invention. Although the disclosed system is described in the context of a system for receiving terrestrial broadcast video signals incorporating ancillary program specific and program guide information in MPEG compatible format, it is exemplary only. The MPEG data format is widely adopted and detailed in the MPEG2 (Moving Pictures Expert Group) image encoding standard, hereinafter referred to as the "MPEG standard", (ISO/IEC 13818-1, Jun. 10, 1994, and ISO/IEC 13818-2, Jan. 22, 1995).

The principles of the invention may be applied to terrestrial, cable, satellite, Internet or computer network broadcast systems in which the coding type or modulation format may be varied. Such systems may include, for example, non-MPEG compatible systems, involving other types of encoded datastreams. Further, although the disclosed system is described as processing broadcast programs, this is exemplary only. The term 'program' is used to represent any form of packetized data such as audio data, telephone messages, computer programs, Internet data or other communications, for example.

In the video receiver system of FIG. 2, a broadcast carrier modulated with signals carrying audio, video and associated data representing broadcast program content is received by antenna 10 and processed by unit 13. The resultant digital output signal is demodulated by demodulator 15. The demodulated output from unit 15 is trellis decoded, mapped into byte length data segments, deinterleaved and Reed-Solomon error corrected by decoder 17. The corrected output data from unit 17 is in the form of an MPEG compatible transport datastream containing program representative multiplexed audio, video and data components. The transport stream from unit 17 is demultiplexed into audio, video and data components by unit 22 which are further processed by the other elements of the decoder 100 system. In one mode, decoder 100 provides MPEG decoded data for display and audio reproduction on units 50 and 55 respectively. In another mode, the transport stream from unit 17 is processed by decoder 100 (and interface 95) to provide an MPEG compatible datastream for storage on storage medium 105 via storage device 90.

Controller 60 configures processor 13, demodulator 15, decoder 17 and decoder system 100 to demodulate and decode the input signal format and coding type. Further, controller 60 configures units 13, 15, and 17 for other communication modes, such as for receiving cable television (CATV) signals and for bi-directional communication via coaxial line 14 or for bi-directional (e.g. Internet) communication, for example, via telephone line 11 or satellite reception via dish 87. In an analog video mode, an NTSC compatible signal is received by units 13, 15 and 17 and processed by unit 27 of decoder 100 for video display and audio reproduction on units 50 and 55 respectively. Units 13, 15, 17 and sub-units within decoder 100 are individually configured for the input signal type by controller 60 through the setting of control register values within these elements using a bi-directional data and control signal bus C.

Controller 60 comprises processor 62 and processor 64. Unit 62 processes (i.e. parses, collates and assembles) system information e.g. timing information, and program specific information to form a database. The database supports communication with local and remote sources and peripheral devices and enables tuning and service acquisition. Individual data packets received by decoder 100 (comprising a User selected program, for example) are identified and assembled using the assembled program specific information within the unit 62 database. The program specific information contains conditional access, network information and identification and linking data enabling the system of FIG. 2 to tune to a desired channel and assemble data packets to form complete programs. The program specific information contained in the unit 62 database also contains ancillary program guide information (e.g. an Electronic Program Guide-EPG) and descriptive text related to the broadcast programs as well as data supporting the identification and assembly of this ancillary information. Processor 64 performs the remaining control functions required in operating decoder 100. Although the functions of unit 60 may be implemented as separate elements 62 and 64 as depicted in FIG. 1, they may alternatively be implemented within a single processor. For example, the functions of units 62 and 64 may be incorporated within the programmed instructions of a microprocessor.

A User operates decoder 100 by entry of commands and by selecting options shown on menus displayed on unit 50 using remote control unit 70 via remote interface 65. Menu options are selected by direct entry of a menu item number or by cursor navigation to an item followed by selection of the item using remote unit 70. In this manner the User selects and initiates a multimedia function such as program play, Email, telephony, Internet access, fax, or DVD/VCR operation and also initiates set-up and adjustment of the decoder 100 system. The entered commands are processed by controller 60 which controls the operation of the elements of decoder 100 using the bi-directional bus C. A user selects for viewing either a TV channel (user selected channel-SC) or an on-screen menu, such as a program guide, by using a remote control unit 70.

The resultant decoded datastream from decoder 17 is provided to demultiplexer 22. The packetized decoded datastream output by interface 17 contains video and audio data representing a video program, for example, and may also contain sub-picture data. Such sub-picture data contains picture elements associated with a program such as display commands, subtitling, content menus, descriptive text, selectable menu options or other items, for example. Packets containing video, audio and sub-picture data are identified in the decoded datastream from decoder 17 by demultiplexer 22 using Packet Identifier (PID) values contained in their respective packet headers.

Demultiplexer 22 matches the PIDs of incoming packets in the datastream from interface 17 with PID values preloaded in control registers within unit 22 by controller 60. Demultiplexer 22 provides the video, audio and sub-picture packets to MPEG video decoder 25, audio processor 35 and sub-picture processor 30 respectively. Decoder 25 decodes and decompresses the MPEG compatible packetized video data from unit 22 and provides decompressed program representative pixel data to NTSC encoder 45 via multiplexer 40. Similarly, audio processor 35 decodes the packetized audio data from unit 22 and provides decoded and amplified audio data synchronized with the associated decompressed video data to device 55 for audio reproduction.

Processor 30 decodes and decompresses sub-picture data received from unit 22 to provide decompressed pixel mapped data to On-Screen Display (OSD) and graphics generator 37. Using the sub-picture data from unit 30 and program specific information from unit 60, unit 37 creates a set of interactive, control and information menu displays for presentation on unit 50. These menu displays include, for example, the hierarchical favorite service lists depicted in FIG. 3 and the EPG and overlaid favorite service list of FIG. 4. The menu displays are generated in the form of overlay pixel map data by OSD generator 37 under direction of controller 60 and are updated using the database maintained by unit 64 in controller 60. This database links particular menus with selectable menu option icons in the menu currently displayed on unit 50. Controller 60 is thereby enabled to determine and generate the next hierarchical menu to be displayed on unit 50 in response to User selection of a current menu option icon.

Figure 3:
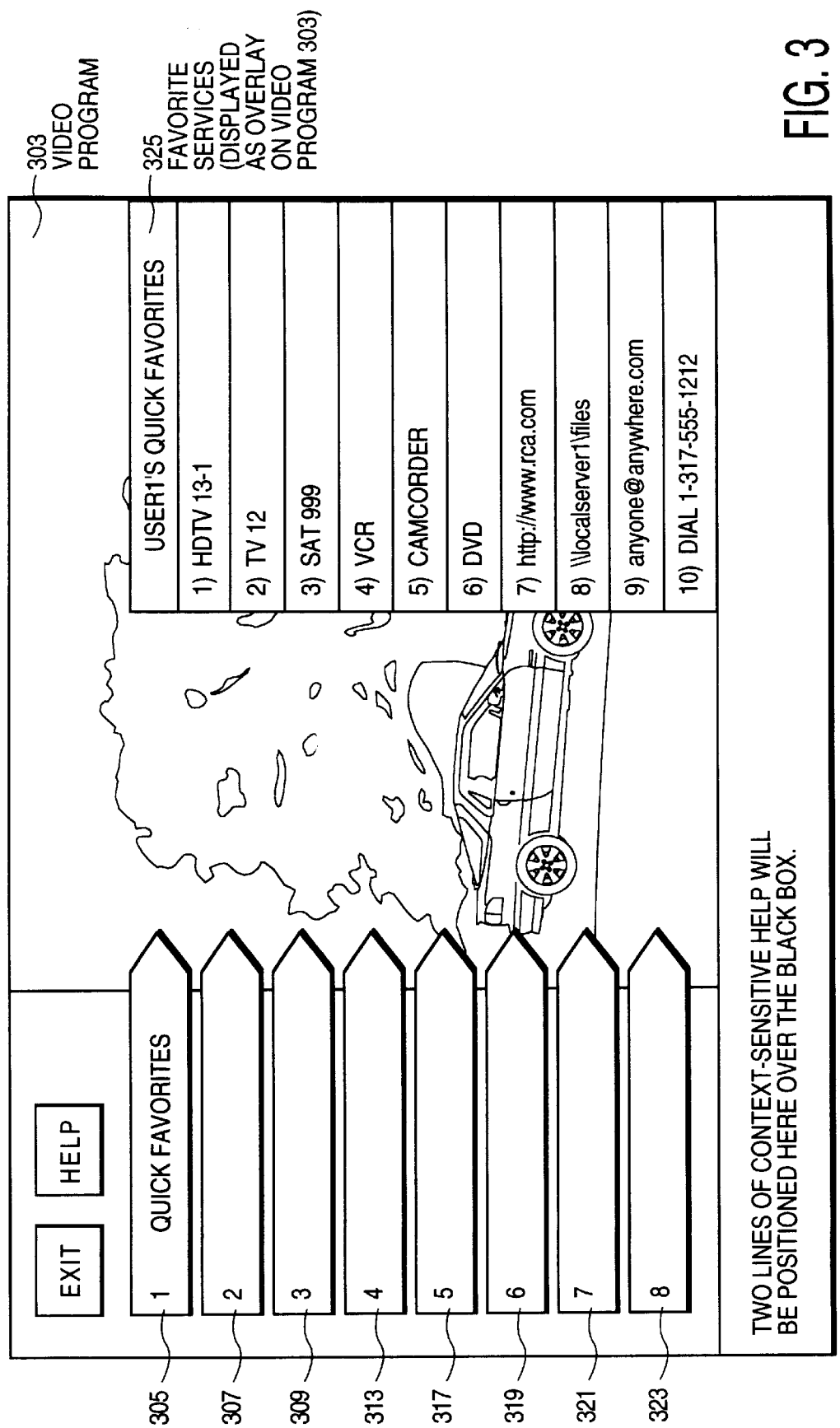
FIG. 3 shows displayed hierarchical favorite service menus containing entries from local and remote service sources, according to the invention.

FIG. 3 shows a hierarchical favorite service menu 325 containing entries from local and remote service sources displayed on unit 50. Menu list 325 is displayed as an overlay on a currently showing video program 303 in response to User selection of icon 305 in the underlying menu. Alternatively, favorite list 325 may be directly displayed in response to a User pressing a button on remote unit 70 such as "Fetch" button 890 of exemplary remote unit 70 of FIG. 6. Items 1–10 in list 325 of FIG. 3 comprise favorite multimedia services previously added to the favorite's list by the User. The exemplary multimedia favorites list 325 includes HDTV, terrestrial and satellite broadcast channels, as well as DVD, VCR, and camcorder functions, an Internet web page URL, a local server file address, an Email address and a telephone number. However, any other local or remote multimedia function may also be added to the favorites list. Any of the services 1–10 in list 325 may be activated by direct entry of the menu item number or by cursor navigation and item selection using remote unit 70. Menu items 307–323 in the underlying menu may comprise a larger list of available services of which list 325 comprises a hierarchically displayed sub-set. Alternatively, items 307–325 may comprise command or other menu selection icons.

The abbreviated list 325 is advantageously displayed during a program or at any time during decoder 100 operation in response to a single remote unit 70 button press. This facilitates User navigation through large numbers of program channels and other multimedia services available on decoder 100 and also minimizes User confusion.

Unit 37 of FIG. 2 generates the menus of FIG. 3 as overlay pixel map data and this pixel map data together with decompressed program data representing video program 303 are directed to encoder 45 via multiplexer 40. The menu and program data is combined in a pixel map memory buffer in unit 45 under direction of controller 60 to form a composite display. Encoder 45 converts the pixel map memory data stored in its memory buffer into conventional luminance and chrominance components. The luminance and chrominance components, together with timing data provided by controller 60, are processed by encoder 45 in a conventional manner to form an NTSC signal for display on NTSC compatible image reproduction device 50 e.g. a television or video monitor. Encoder 45 may, in another embodiment, provide RGB output data for display by an RGB compatible reproduction device or a high definition television. Encoder 45 may be a conventional commercially available integrated circuit for signal conversion and NTSC generation.

Figure 4:
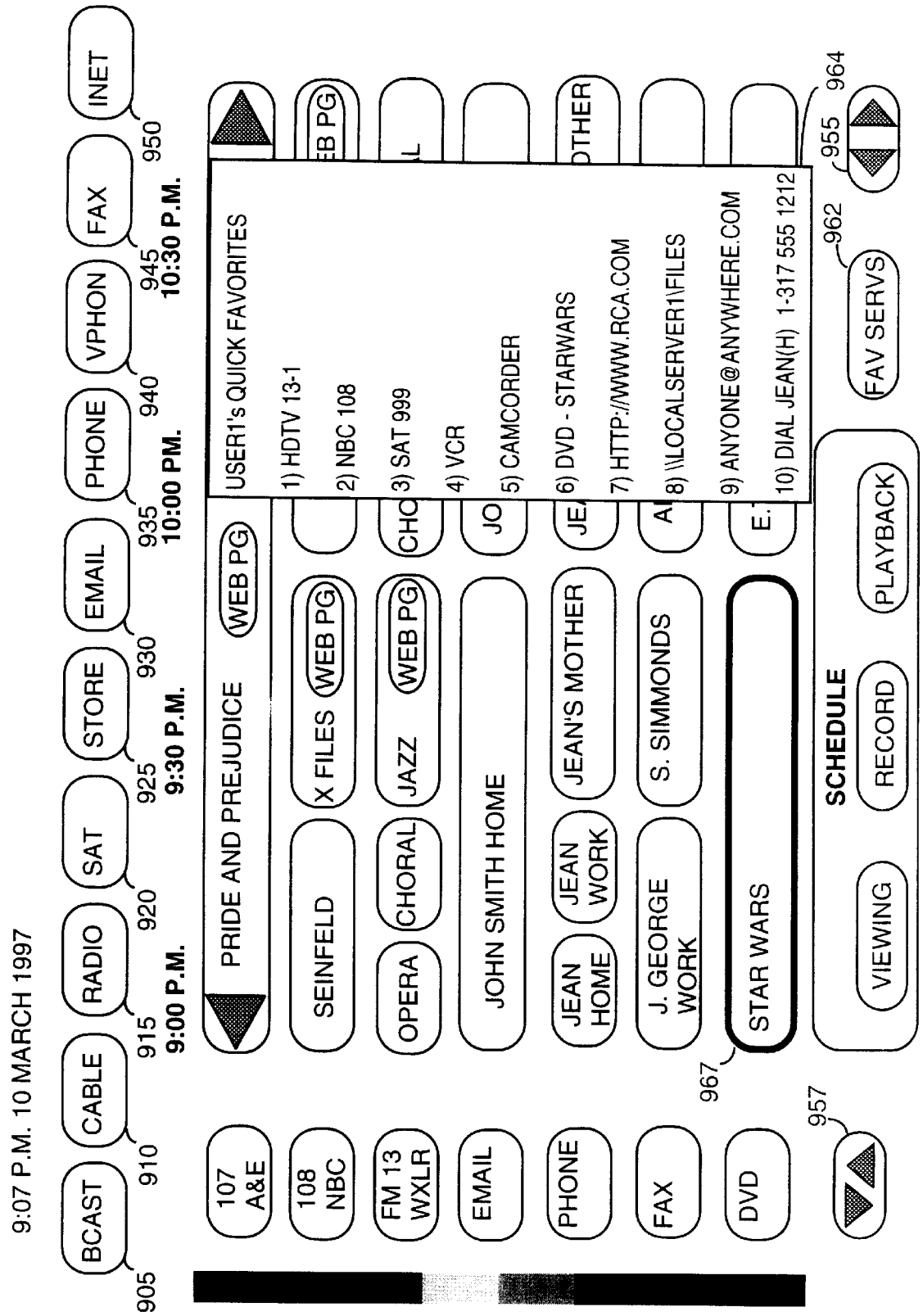
FIG. 4 shows a multimedia decoder function selection interface showing an electronic service guide including an overlaid favorite services list, according to the invention.

FIG. 4 shows a multimedia decoder function selection interface showing an electronic service guide including an overlaid favorite services list 964 similar to list 325 of FIG. 3. As in FIG. 3, abbreviated list 964 is a list of favorite services associated with a specific User (User number one in this example). However, in FIG. 4, favorite services list 964 is displayed as an overlay upon an underlying electronic service (or program) guide and comprises a hierarchically displayed sub-set of the services listed in the service guide. List 964 is displayed in response to User selection of icon 962 in the service guide or upon the User pressing a button on remote unit 70 (e.g. "Fetch" button 890 of remote unit 70 of FIG. 6). A further hierarchical favorite services list may be displayed by selection of an icon in list 964 (not shown for drawing clarity) or by pressing of a remote unit button whilst displaying list 964. Thereby a User is able to refine his search for a desired program or service by navigating through hierarchically displayed favorite service lists of increasing specialization. A first list may comprise 100 favorite services and second, third fourth and fifth lists may comprise 40, 20, 10, and 5 favorite services respectively. Further the list services may be collated according to attributes including (a) the User, as identified by a userid and/or password, and (b) the service source, e.g. satellite, cable, terrestrial Internet, LAN etc. As a result, a User is able to more easily navigate and select a desired program. This is of particular importance in multimedia decoders capable of both, receiving hundreds of video channels from a variety of sources, and performing various other multimedia functions (e.g. functions selectable via icons 905–950 of FIG. 4).

In addition, the hierarchically displayed favorite service menus may comprise automatically generated lists for a specific User derived using (a) predetermined User preferences or (b) records of the most frequently used services. Further, the hierarchically displayed favorite service menus may automatically incorporate items that are associated with listed items e.g. a web-page associated with a movie, for example. Therefore, in this case, a hierarchically displayed favorite service list may contain services that are not found in the previously displayed list in the hierarchy and so does not exclusively comprise a sub-set of this previous list.

The service lists and menus of FIG. 4 are generated by units 37, 40 45, and 60 for display on unit 50 of FIG. 2 in a similar manner to that previously described for the menus of FIG. 3.

Figure 5:
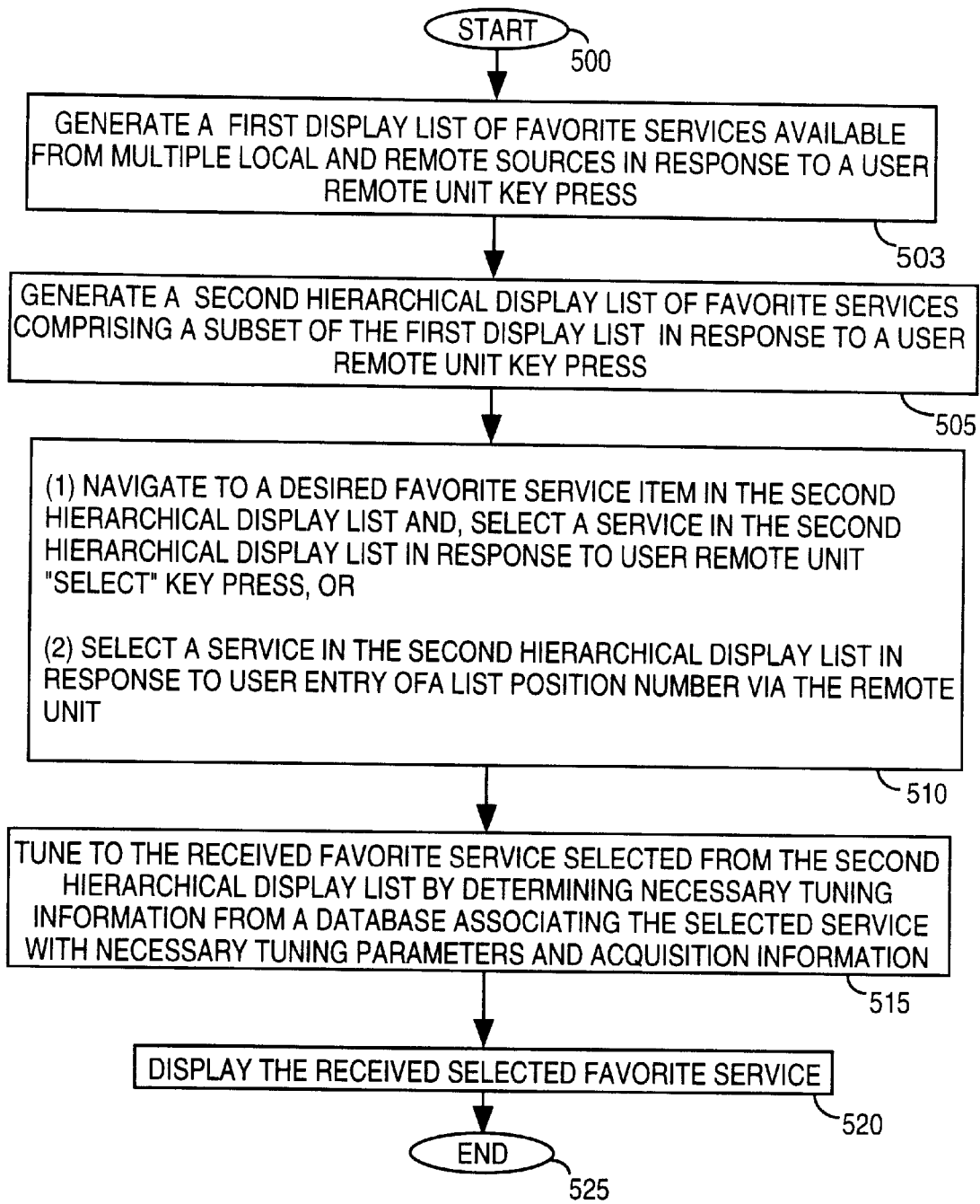
FIG. 5 shows a flowchart for identifying and displaying a favorite service through User navigation of hierarchical favorite service menus, according to the invention.

Controller 60 (in conjunction with decoder 100) employs the process of FIG. 5 to identify and initiate a favorite service for a particular User through User navigation of hierarchical favorite service menus. Following the start at step 500, controller 60 in step 503 generates a first menu list (an Electronic Services Guide, ESG) of favorite multimedia services that are available from remote and local sources for a particular User. The remote sources include terrestrial, satellite or cable TV broadcast sources or Internet and remote network sources and servers, for example. The local sources may include a VCR/DVD, local area network sources and servers, a PC, a set top box, or other local video decoders, for example. Further, the first list is generated in response to a User pressing a button on remote unit 70 or in response to a User selecting a displayed menu item.

In step 505, controller 60 generates a second menu list of favorite local and remote multimedia services for the particular User in response to a User pressing a remote unit 70 button or selecting a displayed menu item. The second list is generated as an overlay (e.g. as in FIGS. 3 and 4) or as a separate window in the image presented on unit 50. The second menu list of favorite services typically comprises a hierarchical sub-set of the services displayed in the first services menu. However, the first services list may alternatively comprise an EPG that tabulates scheduled programs and associated video channels. The first services list may also comprise other lists of services, such as lists of channels, peripheral devices or interfaces that are employed by a User during the set-up, configuration or initialization of decoder 100, for example. A favorite service list that is hierarchically displayed following initial display of an ESG, EPG, or other first list of services may contain services that are not found in the previously displayed first list of services. Consequently, successive hierarchically displayed service lists may not exclusively comprise sub-sets of immediately prior lists.

Figure 6:
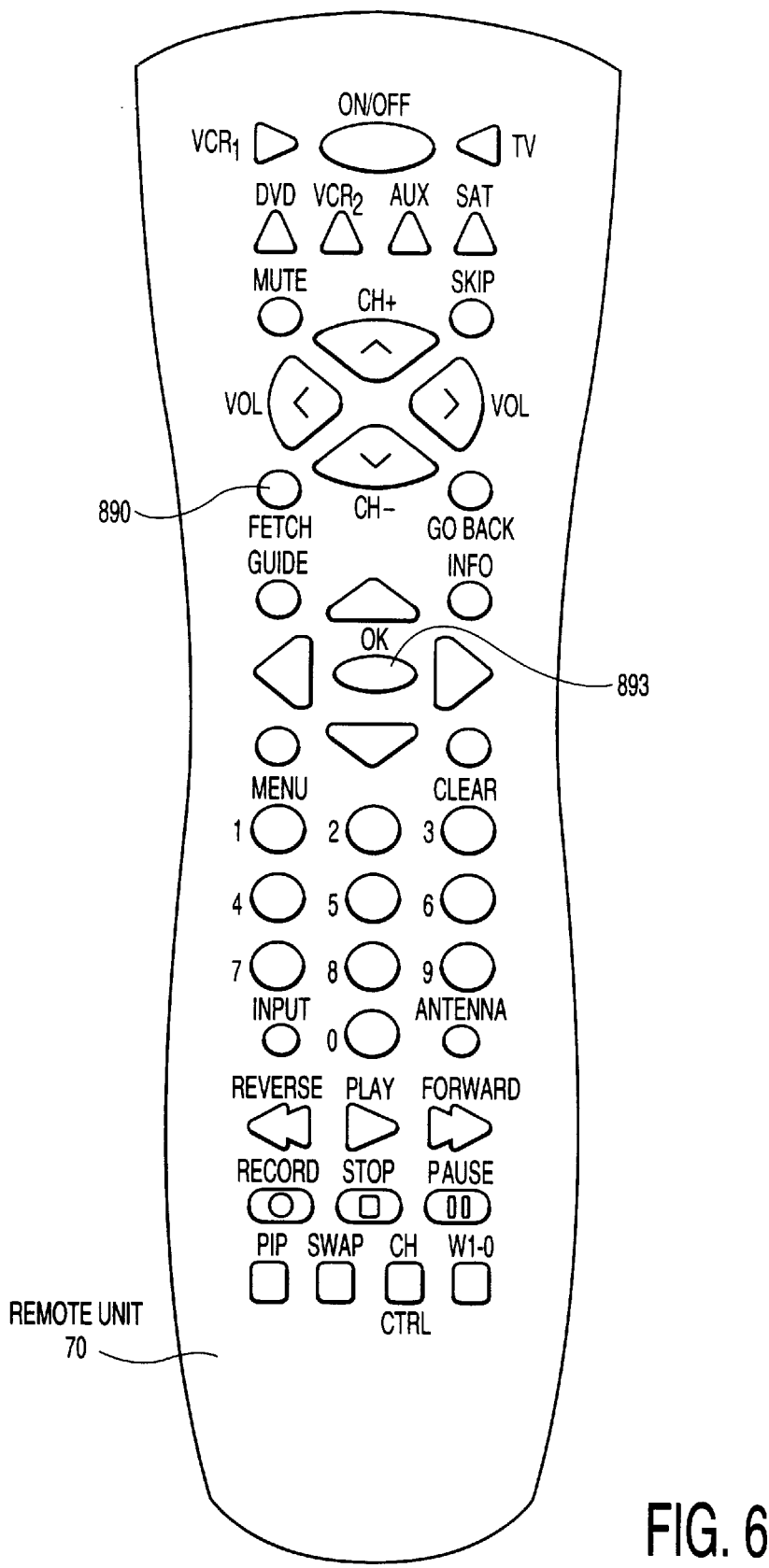
FIG. 6 shows an exemplary remote control unit supporting use of the favorite service lists, according to the invention.

In step 510, controller 60 selects a service in the second service list by direct entry of the menu item number or by cursor navigation and item selection using remote unit 70 (e.g. by using "OK" key 893 of unit 70 of FIG. 6). In step 515 of FIG. 5, controller 60 directs elements within decoder 100 and units 13, 15 and 17 to tune to a service (e.g. a broadcast video channel) and to acquire data and to initiate bi-directional communication a s required to support the selected service. Individual data packets, representing data from the selected service source are identified and assembled by controller 60 and decoder 100 using data identifiers associated with the selected service by the unit 62 database. Similarly, data communicated to a service source by decoder 100 is appropriately formed by controller 60 (and elements of decoder 100 and units 13, 15 and 17) to incorporate the correct protocol and identification codes associated with the selected service and source by the unit 62 database. Further, controller 60 uses the unit 62 database to determine (a) communication protocol (e.g. TCP/IP, SLIP etc.) (b) a communication frequency (e.g. broadcast channel), (c) modulation type (e.g. QAM, QPSK, PAM etc), (d) coding type (e.g. HTTP, FTP, Trellis/non-Trellis, etc.) in establishing uni-directional or bi-directional communication with a service source. In step 520, controller 60, in conjunction with decoder 100, conditions the received data for display on unit 50 in the manner previously described in connection with FIG. 3. The process of FIG. 5 terminates at step 525.

FIG. 6 shows an exemplary remote control unit supporting use of the favorite service lists, as previously described. "Fetch" key 890 may be used to navigate through hierarchical favorite service lists such that successive hierarchically ordered favorite service lists are displayed upon corresponding successive presses of key 890. Alternatively, Fetch key 890 may be assigned different functions upon successive key presses to simplify User creation and manipulation of service lists. For example, in the processes of FIGS. 7 and 8, pressing key 890 a second time results in a selected service being added to a favorite service list as discussed later in connection with these Figures. Further, a select key (e.g. "OK" key 893 of FIG. 6) is used to select a highlighted service in a particular favorite services list. The use of key 890 and 893 in combination, as described in FIGS. 5, 7 and 8, facilitates and simplifies User operation of decoder 100 and favorite service lists.

Controller 60 employs the process of FIG. 7 to facilitate the addition of a favorite multimedia service to a favorite service list of a particular User during operation of the multimedia service i.e. during program play, for example. In step 603 following the start at step 600, controller 60 (in conjunction with decoder 100), generates a menu list of favorite multimedia services for display (on unit 50) during concurrent operation of a multimedia service ("the concurrent service") e.g. during video program play such as program 303 of FIG. 3 or CD play. The favorite service list is generated as an overlay or as a separate window in the image presented on unit 50 during the concurrent service. Further, the favorite service list is generated in response to a User pressing a Fetch key (e.g. key 890 of remote unit 70 of FIG. 6). The menu list generated in step 603 comprises a fixed number of available locations for adding favorite services (ten locations in the examples previously presented in FIGS. 3 and 4). In other embodiments though, a variable length favorite service list may be generated in which added services may be allocated a particular ranking in the list and the number of services in the list may be expanded or reduced as required by User addition or deletion using cursor manipulation and remote unit 70 or any other data entry device (e.g. a keyboard, mouse etc.).

In step 605, a location is selected in the displayed favorite service list previously generated in step 603 (e.g. locations 1–10 in list 325 of FIG. 3). A location is selected in step 605 by direct entry (with remote unit 70) of the menu item code identifying an available list location or identifying a service to be replaced. Alternatively, a location may be selected by cursor navigation and item selection using remote unit 70. In step 608, the concurrent service is added to the list by controller 60 in the location selected in step 605 in response to a User pressing the Fetch key for the second time (e.g. key 890 of FIG. 6). Once the service is added to the favorite service list, it may be activated in a manner similar to that previously described in steps 510 and 515 of FIG. 5. The process of FIG. 7 terminates at step 610.

Controller 60 employs the process of FIG. 8 to facilitate the addition of a favorite multimedia service selected from a first list of services to a second list services comprising the favorite services of a particular User. Following the start at step 620, controller 60 in step 623 selects a service item presented in a first list of services on unit 50 (FIG. 2). A service item is selected from the first list in step 620 by direct entry of an identification menu item code or by cursor navigation and item selection using remote unit 70. The first services list may comprise an ESG, EPG, or a list of services, channels, peripheral devices or interfaces that is employed by a User during the set-up, configuration or initialization of decoder 100, for example.

In step 625 controller 60 (operating with decoder 100) generates a second menu list of favorite multimedia services for display on unit 50 in response to the User pressing a Fetch key (e.g. key 890 shown in FIG. 6). The second menu list generated in step 625 (FIG. 8) comprises a fixed number of available locations for adding favorite services. In other embodiments though, a variable length favorite service list may be generated as previously described in connection with FIG. 7.

In step 627, a location is selected in the displayed favorite service list by direct entry of a menu item identification code or by cursor navigation and item selection using remote unit 70 (e.g. selection of one of locations 1–10 in list 964 of FIG. 4). In step 630, the service selected in step 625 is added to the second menu list in the location selected in step 627 in response to a User pressing the Fetch key for the second time (e.g. key 890 of FIG. 6). Once the service is added to the favorite service list, it may be activated in a manner similar to that previously described in steps 510 and 515 of FIG. 5. The process of FIG. 8 terminates at step 630.

An example of applying the process of FIG. 8 is shown in FIG. 4. Specifically, in step 623, a DVD movie-Starwars, (item 967 of FIG. 4) is selected in the EPG of FIG. 4 following menu scrolling using icons 957 and 955 (FIG. 4) and cursor navigation using remote unit 70, for example. In step 625, a second menu list (964 of FIG. 4) is generated as an overlay on the EPG and in step 627, item 6 (of list 964) is selected as a list item to be replaced. In step 630, the movie Starwars is added as item 6 (of list 964) replacing the current item 6.

The architecture of FIG. 2 and the exemplary processes of FIGS. 5, 7 and 8 are not exclusive. Other architectures and processes may be derived in accordance with the principles of the invention to accomplish the same objectives. Further, the functions of the elements of decoder 100 of FIG. 2 and the process steps of FIGS. 5, 7 and 8 may be implemented in whole or in part within the programmed instructions of a microprocessor.

What is claimed is:

1. Apparatus for receiving video program data from a plurality of different multimedia sources and including an on-screen display interface system enabling navigation through user selected favorite multimedia services, comprising:

a menu display generator for generating a first menu display of favorite multimedia services comprising an abbreviated list of available services and including a broadcast video service available from a remote broadcast source and a non-broadcast video service available from a local device peripherally connected to said apparatus, wherein said first menu display of favorite multimedia services lists at least two of (a) a video channel, (b) an Internet web page, (c) an Email address, and (d) a telephone number;

a database associating individual services and corresponding menu items in said favorite services menu with their respective remote and local sources;

a selection processor selecting a desired service within said menu of favorite services in response to user input; and a processor for acquiring said selected desired service.

2. Apparatus according to claim 1 wherein said menu display generator generates a second hierarchical menu display of favorite services comprising a sub-set of services in said first menu display of favorite multimedia services.

3. Apparatus according to claim 1 wherein said first menu display of favorite multimedia services comprises a composite sub-set of multimedia services listed in a second menu display.

4. Apparatus according to claim 1 wherein said remote broadcast source includes at least one of (a) satellite, (b) cable, (c) terrestrial, and (d) Internet network sources, and said local device peripherally connected to said apparatus includes at least one of (i) a VCR, (ii) a DVD, (iii) a local area network source, (iv) a PC, and (v) a set top box, (vi) a local video decoder.

5. Apparatus for receiving video program data from a plurality of different multimedia sources and including an on-screen display interface system enabling navigation through user selected favorite multimedia services, comprising:

a menu display generator for generating a first menu display of favorite multimedia services comprising an abbreviated list of available services and including a broadcast video service available from a remote broadcast source and a non-broadcast video service available from a local device peripherally connected to said apparatus;

a database associating individual services and corresponding menu items in said favorite services menu with their respective remote and local sources wherein said database further associates an individual favorite service with one of, (a) an analog signal, and (b) a digital signal;

a selection processor selecting a desired service within said menu of favorite services in response to user input; and a processor for acquiring said selected desired service.

6. Apparatus according to claim 1 wherein said first menu display of favorite multimedia services contains favorite services associated with at least one of (a) a first user, (b) a first service type, and (c) a first source.

7. Apparatus according to claim 1 including a menu update processor for adding a multimedia service to said favorite multimedia services menu in response to a user favorite service input selection.

8. Apparatus according to claim 1 wherein said menu display generator generates a second hierarchical menu display of favorite multimedia services comprising a sub-set of services in said first menu display of favorite multimedia services, and said second menu is hierarchically displayed in response to user selection of an item displayed in said first menu.

9. Apparatus according to claim 1 wherein said database associates an individual multimedia service with a signal format for use in acquiring and decoding a selected multimedia service.

10. Apparatus according to claim 1 wherein said first menu display of favorite multimedia services is automatically generated based on at least one of (a) predetermined User preference criteria and (b) records of the most frequently used services.

11. Apparatus for receiving video program data from a plurality of different sources and including an on-screen display interface system enabling navigation through user selected favorite services, comprising:

a menu display generator for generating menu displays of favorite services available from a plurality of different sources, said menu displays including, a first menu display of a first set of services comprising a sub-set of available services, and a second hierarchical menu display of favorite services comprising a sub-set of said first set of services, said second menu being hierarchically displayed in response to user selection of an item displayed in said first menu wherein said second hierarchical menu display comprises favorite multimedia services including a broadcast video service and a non-broadcast video service;

a selection processor selecting a desired service within said second menu of favorite services in response to user input; and a processor for acquiring said selected desired service.

12. Apparatus for receiving video program data from a plurality of different sources and including an on-screen display interface system enabling navigation through user selected favorite services, comprising:

a menu display generator for generating menu displays of favorite services available from a plurality of different sources, said menu displays including, a first menu display of a first set of services comprising a sub-set of available services, and a second hierarchical menu display of favorite services comprising a sub-set of said first set of services, said second menu being hierarchically displayed in response to user selection of an item displayed in said first menu;

a selection processor selecting a desired service within said second menu of favorite services in response to user input; and a processor for acquiring said selected desired service wherein said second hierarchical menu display lists services including a broadcast video service available from a remote broadcast video source and a non-broadcast video service available from a local device peripherally connected to said apparatus.

13. Apparatus for receiving video program data from a plurality of different sources and including an on-screen display interface system enabling navigation through user selected favorite services, comprising:

a menu display generator for generating menu displays of favorite services available from a plurality of different sources, said menu displays including, a first menu display of a first set of services comprising a sub-set of available services, and a second hierarchical menu display of favorite services comprising a sub-set of said first set of services, said second menu being hierarchically displayed in response to user selection of an item displayed in said first menu;

a database associating individual services and corresponding menu items in said second hierarchical menu display with their respective remote and local sources;

a selection processor selecting a desired service within said second menu of favorite services in response to user input; and a processor for acquiring said selected desired service.

14. Apparatus according to claim 11 including a menu update processor for adding a multimedia service to said second hierarchical menu display in response to a user input selection.

15. Apparatus for receiving video program data from a plurality of different sources and including an on-screen display interface system enabling navigation through user selected favorite services, comprising:

a menu display generator for generating menu displays of favorite services available from a plurality of different sources, said menu displays including, a first menu display of a first set of services comprising a sub-set of available services, and a second hierarchical menu display of favorite services comprising a sub-set of said first set of services, said second menu being hierarchically displayed in response to user selection of an item displayed in said first menu wherein said second hierarchical menu display includes favorite multimedia services and lists at least two of (a) a video channel, (b) an Internet web page, (c) an Email address, and (d) a telephone number;

a selection processor selecting a desired service within said second menu of favorite services in response to user input; and a processor for acquiring said selected desired service.

16. Apparatus according to claim 11 wherein said different sources include, a remote broadcast video source including at least one of (a) satellite, (b) cable, (c) terrestrial, (d) Internet network sources, and include a local device peripherally connected to said apparatus comprising at least one of (i) a VCR, (ii) a DVD, (iii) a local area network source, (iv) a PC, and (v) a set top box, (vi) a local video decoder.

17. Apparatus according to claim 11 wherein said first menu display contains services associated with at least one of (a) a first user, and (b) a first service type.

18. Apparatus according to claim 17 wherein said second hierarchical menu display contains favorite services associated with at least one of (a) a second service type, (b) a second source, and (c) a program category.

19. Apparatus for receiving video program data from a plurality of different sources and including an on-screen display interface system enabling navigation through user selected favorite services, comprising:

a menu display generator for generating menu displays of favorite services available from a plurality of different sources, said menu displays including, a first menu display of a first set of services comprising a sub-set of available services, and a second hierarchical menu display of favorite services comprising a sub-set of said first set of services, said second menu being hierarchical displayed in response to user selection of an item displayed in said first menu wherein said first menu display comprises a list including at least one of (a) a plurality of peripheral devices locally attached to said apparatus, and (b) a plurality of interfaces for use in locally attaching devices to said apparatus;

a selection processor selecting a desired service within said second menu of favorite services in response to user input; and a processor for acquiring said selected desired service.

20. In a device for receiving video program data from a plurality of different sources and including an on-screen display interface system enabling navigation through user selected favorite services, a method comprising the steps of:

generating menu displays of favorite services available from a plurality of different sources, said menu displays including, a first menu display of a first set of services comprising a sub-set of available services, and a second hierarchical menu display of favorite services comprising a sub-set of said first set of services;

hierarchically displaying said second hierarchical menu in response to user selection of an item displayed in said first menu;

selecting a desired service within said second menu of favorite services in response to user input using a database associating individual services and corresponding menu items in said second hierarchical menu display with their respective remote and local sources; and acquiring said selected desired service.

21. A method according to claim 20 including the steps of adding a service to said second hierarchical menu in response to a user input selection.

22. In a device for receiving video program data from a plurality of different multimedia sources and including an on-screen display interface system enabling navigation through user selected favorite multimedia services, a method comprising the steps of:

generating a first menu display of favorite multimedia services comprising an abbreviated list of available services and including a broadcast video service and a non-broadcast video service available from a local device peripherally connected to said apparatus and from a remote broadcast video source;

selecting a desired service within said menu of favorite services in response to user input; and acquiring said selected desired service using a database associating individual services and corresponding menu items in said favorite services menu with their respective remote and local sources wherein said database further associates an individual favorite service with one of, (a) an analog signal, and (b) a digital signal.

23. A method according to claim 22 including the step of generating a second hierarchical menu display of favorite services comprising a sub-set of services in said first menu display of favorite multimedia services.

* * * * *